(12) United States Patent
Creed et al.

(10) Patent No.: US 11,698,865 B1
(45) Date of Patent: Jul. 11, 2023

(54) ACTIVE DATA PLACEMENT ON CACHE EVICTION

(71) Applicant: Dell Products L.P., Hopkinton, MA (US)

(72) Inventors: John Creed, Innishannon (IE); Owen Martin, Hopedale, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 17/839,528

(22) Filed: Jun. 14, 2022

(51) Int. Cl.
*G06F 3/06* (2006.01)
*G06F 12/0891* (2016.01)

(52) U.S. Cl.
CPC .......... *G06F 12/0891* (2013.01); *G06F 3/061* (2013.01); *G06F 3/067* (2013.01); *G06F 3/0659* (2013.01)

(58) Field of Classification Search
None
See application file for complete search history.

(56) References Cited

U.S. PATENT DOCUMENTS

| 10,387,399 | B1 * | 8/2019 | McKelvie | G06F 16/23 |
| 2017/0212687 | A1 * | 7/2017 | Kelly | G06F 3/0605 |

* cited by examiner

Primary Examiner — Brian R Peugh
(74) Attorney, Agent, or Firm — Anderson Gorecki LLP

(57) ABSTRACT

A data storage system with interconnected compute nodes includes a shared memory with volatile and non-volatile portions. Data tracks evicted from the volatile portion are moved to the non-volatile portion based on a cache-miss interarrival rate threshold that is calculated based on capacity and fall-through time of the non-volatile portion of the shared memory. Data extents on non-volatile drives are characterized based on dominant modes of extent-level cache-miss interarrival histograms generated using countdown timers of most recent backend accesses of sub-extents. The dominant mode of the extent in which a backend track evicted from the volatile portion of the shared memory resides is compared with the threshold in order to determine whether to move the backend track to the non-volatile portion of the shared memory.

20 Claims, 5 Drawing Sheets

ACTIVE DATA PLACEMENT ON CACHE EVICTION

TECHNICAL FIELD

The subject matter of this disclosure is generally related to reducing data access latency in a data storage system by improving the cache-hit rate.

BACKGROUND

High-capacity data storage systems such as storage area networks (SANs) are used to maintain large storage objects that are contemporaneously accessed by instances of host applications running on clustered host servers. Examples of host applications may include, but are not limited to, software for email, accounting, manufacturing, inventory control, and a wide variety of other organizational processes. The SAN includes a network of interconnected compute nodes and arrays of managed disk drives. The compute nodes access the drives in response to input-output (IO) commands from host application instances to read and write data to storage objects. Data that is needed to service an IO may already be in the cache of one of the compute nodes when the IO is received. Such an event is referred to as a "cache-hit." A "cache miss" occurs when the data needed to service the IO is not in the cache when the IO is received. In the event of a cache-miss, the data is retrieved from the disk drives. A cache-hit IO require less time to complete than a cache miss IO because the cache has lower access latency than the disk drives.

SUMMARY

The following summary is not intended to be comprehensive or otherwise limiting. Additional example, aspects, and features are included in the detailed description. All examples, aspects, and features mentioned in this document can be combined in any technically possible way.

An apparatus in accordance with some implementations comprises.

A method in accordance with some implementations comprises.

In accordance with some implementations a non-transitory computer-readable storage medium stores instructions that when executed by a computer cause the computer to perform a method for using a computer system to store data, the method comprising:

DETAILED DESCRIPTION

The terminology used in this disclosure is intended to be interpreted broadly within the limits of subject matter eligibility. The terms "cache" and "memory" are used interchangeably and do not imply that the resources are on any particular integrated circuit chip. The terms "disk" and "drive" are used interchangeably herein and are not intended to refer to any specific type of non-volatile electronic storage media. The terms "logical" and "virtual" are used to refer to features that are abstractions of other features, e.g., and without limitation abstractions of tangible features. The term "physical" is used to refer to tangible features that possibly include, but are not limited to, electronic hardware. For example, multiple virtual computers could operate simultaneously on one physical computer. The term "logic," if used herein, refers to special purpose physical circuit elements, firmware, software, computer instructions that are stored on a non-transitory computer-readable medium and implemented by multi-purpose tangible processors, alone or in any combination. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
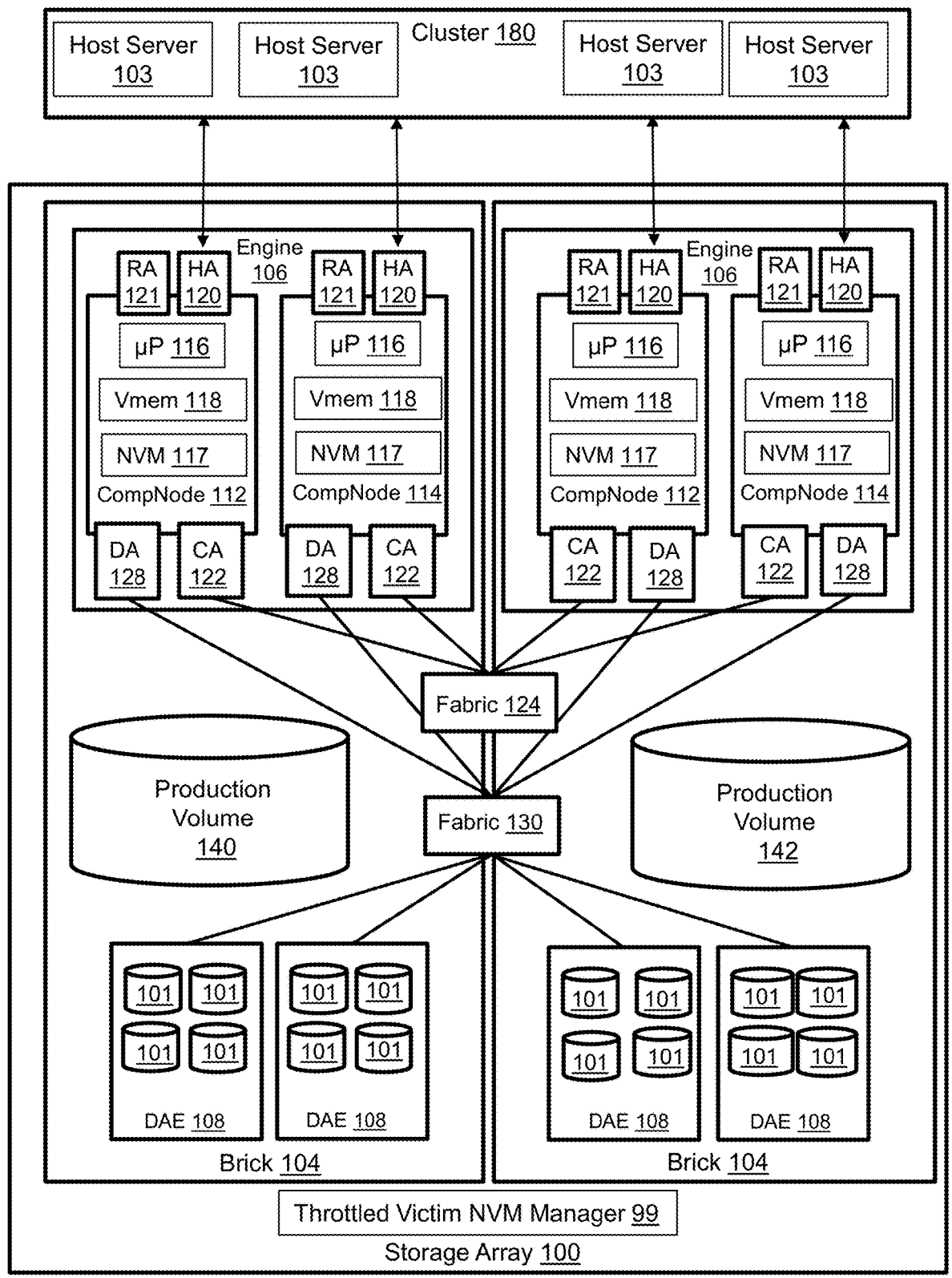
FIG. 1 illustrates a storage array configured with a throttled victim NVM manager.

FIG. 1 illustrates a storage array 100 configured with a throttled victim non-volatile memory (NVM) manager 99 that helps to increase the cache hit rate. The storage array is depicted in a simplified data center environment supporting a cluster 180 of host servers 103 that run host applications. The host servers may be implemented as individual physical computing devices, virtual machines running on the same hardware platform under control of a hypervisor, or in containers on the same hardware platform. The storage array 100 includes one or more bricks 104. Each brick includes an engine 106 and one or more drive array enclosures (DAEs) 108. Each engine 106 includes a pair of interconnected compute nodes 112, 114 in a failover relationship with mirrored data and metadata in shared memory. The compute nodes may be referred to as "storage directors." Although it is known in the art to refer to the compute nodes of a SAN as "hosts," that naming convention is avoided in this disclosure to help distinguish the network server hosts 103 from the compute nodes 112, 114. Nevertheless, the host applications could run on the compute nodes, e.g., on virtual machines or in containers.

Each compute node of the storage array includes at least one multi-core processor 116, local volatile memory 118, and local non-volatile memory (NVM) 117. The processor 116 may include central processing units (CPUs), graphics processing units (GPUs), or both. The local volatile memory 118 may include volatile media such as dynamic random-access memory (DRAM). The NVM may include storage class memory (SCM), which is non-volatile because it includes an integrated power source that maintains memory cells when external power is unavailable. Each compute node includes one or more host adapters (HAs) 120 for communicating with the host servers 103. The host adapters have resources for servicing input-output commands (IOs) 199 from the host servers, e.g., processors, volatile memory, and ports via which the host servers may access the storage array. Each compute node also includes a remote adapter (RA) 121 for communicating with other storage systems. Each compute node also includes one or more drive adapters (DAs) 128 for communicating with managed drives 101 in the DAEs 108. Each DA has processors, volatile memory, and ports via which the compute node may access the DAEs for servicing IOs. Each compute node may also include one or more channel adapters (CAs) 122 for communicating with other compute nodes via an interconnecting fabric 124. The managed drives 101 are non-volatile electronic data storage media such as, without limitation, solid-state drives (SSDs) based on electrically erasable programmable read-only memory (EEPROM) technology such as NAND and NOR flash memory and hard disk drives (HDDs) with spinning disk magnetic storage media. Drive controllers may be associated with the managed drives as is known in the art. An interconnecting fabric 130 enables implementation of an N-way active-active back end. A back-end connection group includes all drive adapters that can access the same drive or drives. In some implementations every DA 128 in the storage array can reach every DAE via the fabric 130. Further, in some implementations every DA in the storage array can access every managed drive 101. For context, an implementation will be described in which the NVM is SCM and the managed drives 101 are all SSDs with the same data access latency and storage capacity.

Data associated with instances of a host application running on the hosts 103 is maintained on the managed drives 101. The managed drives 101 are not discoverable by the hosts but the storage array creates logical storage objects referred to herein as production volumes 140, 142 that can be discovered and accessed by the hosts. Without limitation, a production volume may be referred to as a storage device, source device, production device, or production LUN, where the logical unit number (LUN) is a number used to identify logical storage volumes in accordance with the small computer system interface (SCSI) protocol. From the perspective of the hosts 103, each production volume is a single drive having a set of contiguous logical block addresses (LBAs) on which data used by instances of the host application resides. However, the host application data is stored at non-contiguous addresses on various managed drives 101, e.g., at ranges of addresses distributed on multiple drives or multiple ranges of addresses on one drive.

Figure 2:
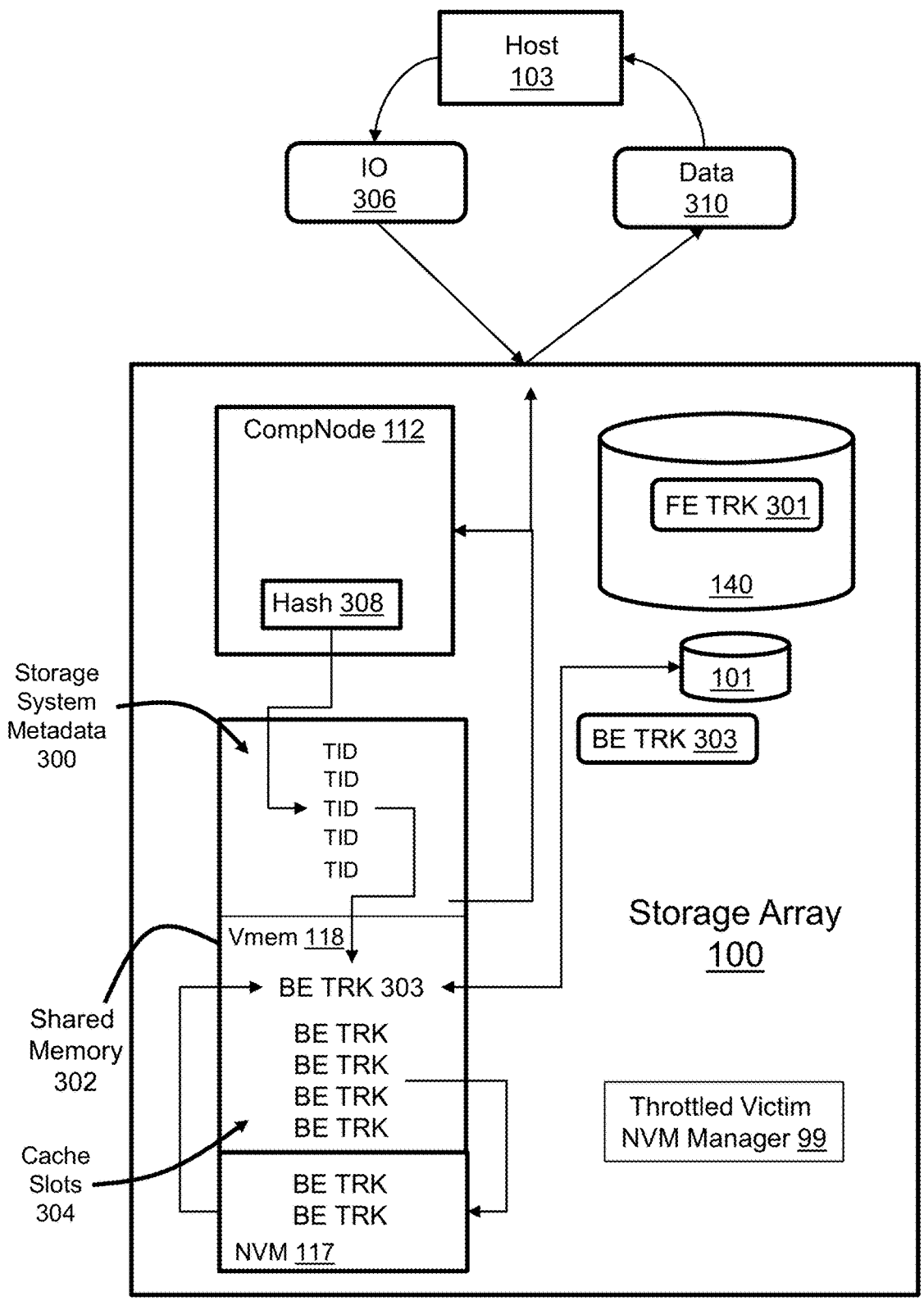
FIGS. 2 illustrates how shared memory is used to service IOs.

Referring to FIGS. 1 and 2, the basic allocation unit of storage capacity that is used by the compute nodes to access the managed drives 101 is known as a back-end track (BE TRK). BE TRKs may, but do not necessarily, all have the same fixed size, which may be an integer multiple of the managed drive sector size. The managed drives 101 may each be organized into back-end (BE) slices of equal storage capacity. Each BE slice may include multiple BE TRKs. Host application data is logically stored in front-end tracks (FE TRKs), that may be referred to as blocks, on the production volumes 140, 142, but physically stored on BE TRKs. BE TRKs and FE TRKs should not be confused with the "tracks" that are related to HDD architecture. An HDD track corresponds to a concentric band on a disk and a sector is a portion of one of those concentric bands, e.g., 1 track may have 32 sectors. BE TRKs are larger in size than HDD tracks, e.g., 128 KB rather than 512 bytes, and are not limited by the physical architecture of a spinning disk. The BE TRK size for a SAN is selected as a design choice and is generally proportional to the manageability of the metadata, but inversely proportional to resource utilization efficiency. Using larger capacity BE TRKs can reduce the resource burden on memory and processing resources for metadata management but decreases the efficiency of managed drive utilization by creating more unused space in BE TRKs. However, as the total storage capacity of drives and SANs increases due to technological advances there is a greater need to increase the BE TRK size and/or implement multiple BE TRK sizes to mitigate the metadata management burden on memory and processing resources.

Each compute node 112, 114 allocates a portion of its local volatile memory 188 and a portion of its local NVM 117 to a shared "global" memory 302 that can be accessed by all compute nodes of the storage array via direct memory access (DMA). In the illustrated example, one of the compute nodes 112 receives an IO command 306 from one of the hosts 103, e.g., to read from or write to a FE TRK 301 of production volume 140. Storage system metadata 300 is maintained in track identification tables (TIDs) that are located in an allocated portion of the volatile memory 118 of the shared memory 302. The TIDs include pointers to BE TRKs that contain host application data. BE TRKs reside on the managed drives 101 and are temporarily paged-in to a cache slots 304 portion of the volatile memory 118 to service IOs. The compute node 112 identifies a TID corresponding to the IO command 306 and FE TRK 301 by inputting information such as the device number, cylinder number, head, and size obtained from the IO into a hash table 308. The hash table 308 indicates the location of the TID in the shared memory 302. The TID is used by the compute node 112 to find the corresponding host application data in the BE TRK 303 indicated by the TID. Specifically, the BE TRK 303 is accessed in the volatile memory 118 if it is present or, alternatively, the BE TRK is copied from the NVM 117 into the volatile memory 118 cache slots 304 if it is present in the NVM. If the corresponding BE TRK 303 is not present anywhere in the shared memory 302, then the compute node 112 uses the TID to locate and copy the BE TRK 303 from the managed drives 101 into the volatile memory cache slots 304 to service the IO. In the case of a Read IO, the FE TRK data 310 specified by the IO 306 is obtained from the BE TRK 303 in the cache slots and a copy of the data is sent to the host 103. In the case of a Write IO the FE TRK data is copied into the BE TRK in the cache slots.

BE TRKs are evicted from shared memory in order to free space for other BE TRKs that are paged-in to service new IOs. Eviction algorithms may select the least recently used (LRU) BE TRK for eviction from shared memory, where the LRU BE TRK is the BE TRK that was least recently accessed in shared memory. Separate eviction threads are used to independently manage evictions from the volatile memory 118 and the NVM 117. The throttled victim NVM manager 99 selects some of the BE TRKs evicted from the volatile memory portion of shared memory to be relocated to the SCM portion of the shared memory. Non-selected BE TRKs are evicted from the volatile memory in a standard manner, e.g., discarded or destaged to the managed drives depending on whether the data is dirty.

Figure 3:
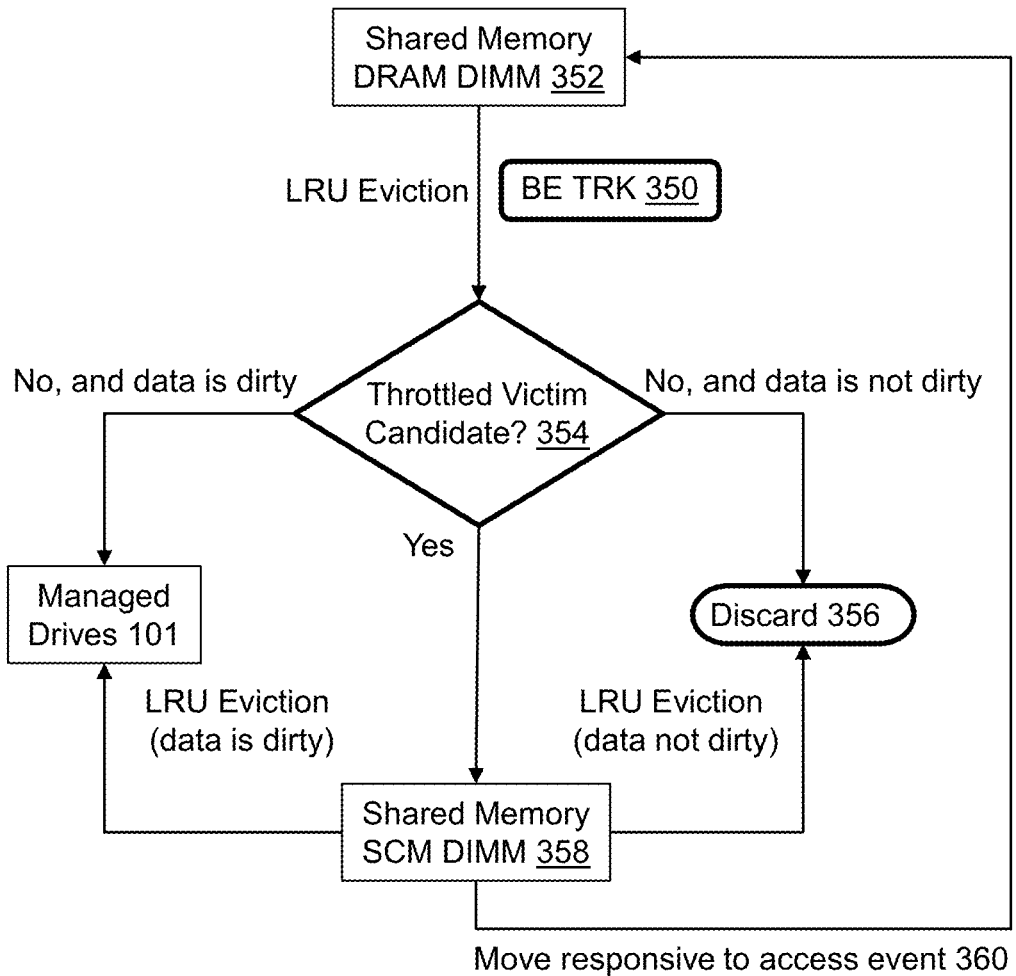
FIG. 3 illustrates operation of the throttled victim NVM manager.

FIG. 3 illustrates operation of the throttled victim NVM manager. When a BE TRK 350 is evicted from a shared memory DRAM DIMM 352, the throttled victim NVM manager calculates whether the evicted BE TRK is a throttled victim candidate as indicated at step 354. The calculation includes using a record of the interarrival rate of cache misses to determine whether moving the BE TRK into SCM 358 is worthwhile in terms of resource cost versus likelihood of a future cache-hit. The storage capacity of the managed drives is much greater than the storage capacity of the SCM, so only a fraction of the BE TRKs can be maintained in the SCM at any point in time. Further, the benefit of a cache hit diminishes relative to the cost of shared memory in proportion to the amount of time between accesses. If the BE TRK 350 is determined to not be a throttled victim candidate, then the BE TRK is destaged to the managed drives 101 if the BE TRK contains dirty/updated data. Otherwise, the BE TRK is discarded as indicated at step 356. If the BE TRK 350 is determined to be a throttled victim candidate, then the BE TRK is moved into a shared memory SCM DIMM 358. An access event 360 will cause the BE TRK to be moved from the shared memory SCM DIMM 358 back into the shared memory DRAM DIMM 352. An example of an access event is an IO from a host that reads or writes to the BE TRK. When not accessed, the BE TRK 350 is eventually evicted from the shared memory SCM DIMM 358 to free space for a different BE TRK by an LRU algorithm. The evicted BE TRK 350 is destaged to the managed drives 101 if the BE TRK contains dirty/updated data. Otherwise, the evicted BE TRK is discarded as indicated at step 356.

Figure 4:
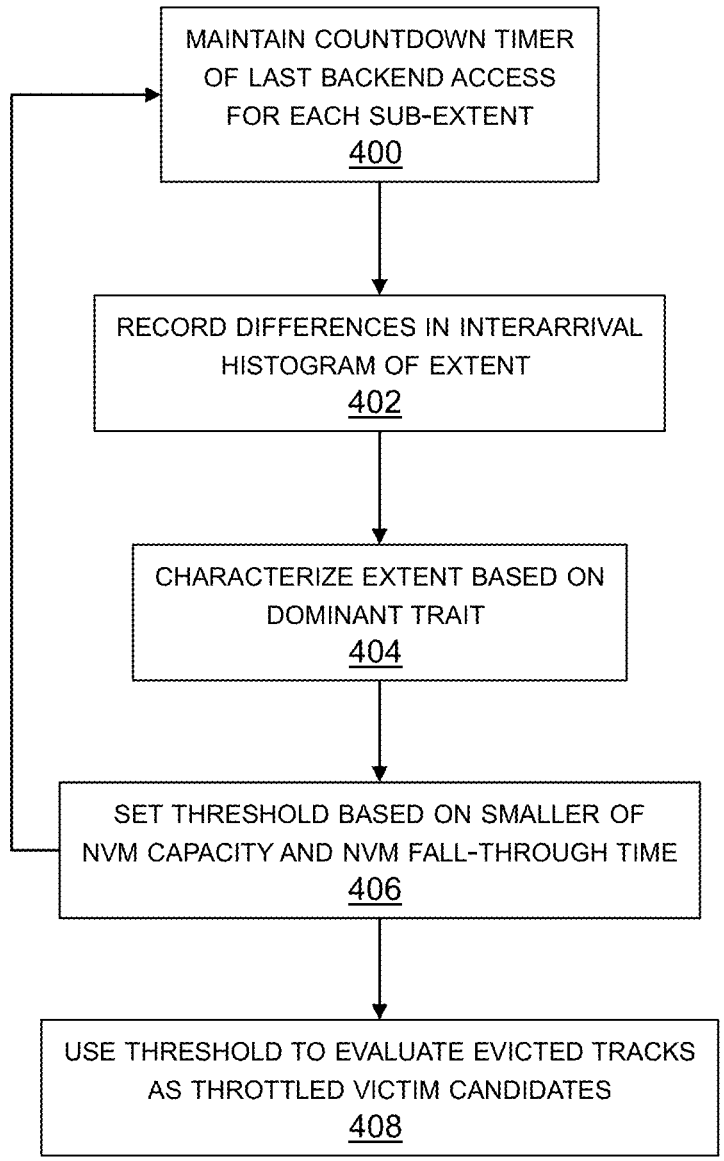
FIG. 4 illustrates how the throttled victim NVM manager determines how to handle an evicted track of data.
Figure 5:
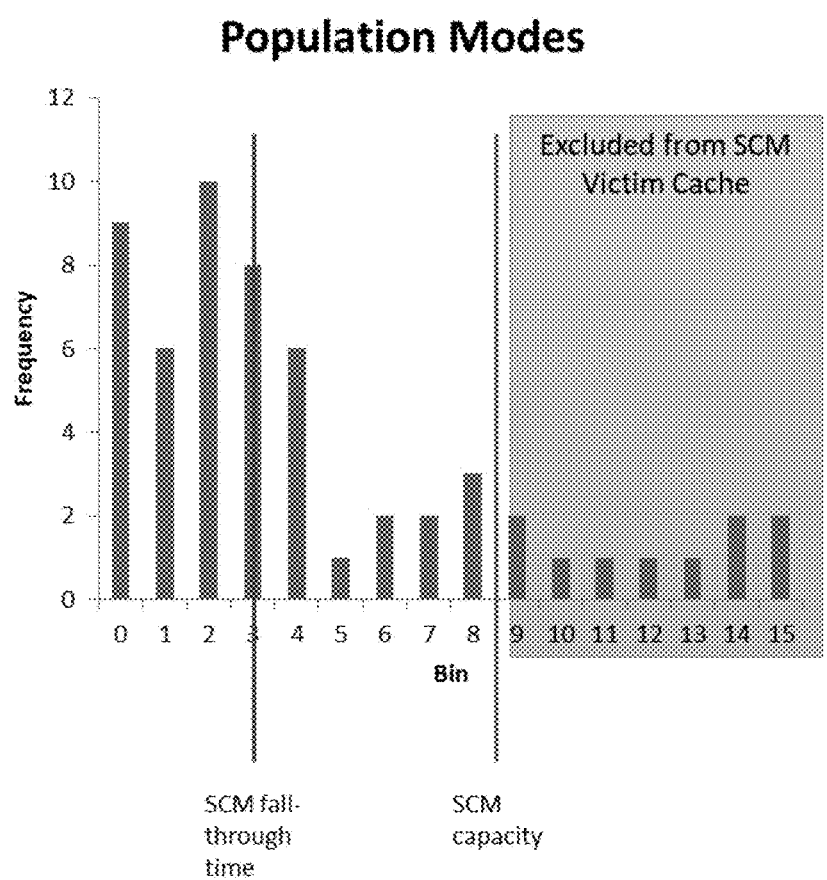
FIG. 5 illustrates an interarrival histogram of cache-misses.

FIGS. 4 and 5 illustrate how the throttled victim NVM manager determines whether the evicted BE TRK is a throttled victim candidate. Backend storage on the managed drives may be organized as thinly-provisioned storage objects, the capacity of which is divided into regions, extents, and sub-extents. For context, the extents might be 256 MB and the sub-extents might be 5 MB. Countdown timers are maintained for each sub-extent as indicated in step 400. Each timer may be initialized to 0, incremented every hour or other unit of time, and reset to 0 in response to backend access, i.e., from the managed drives, of the sub-extent. The count is not reset based on frontend access of the sub-extent, i.e., access from the shared memory. When the sub-extent is accessed from the backend, a bin corresponding to the timer value is incremented, e.g., where bin 1 corresponds to 1 minute since most recent backend access, bin 2 corresponds to 1 hour, bin 3 corresponds to 4 hours, bin 4 corresponds to 8 hours, and so forth. An extent-level histogram is generated using the bin counts of all sub-extents of the extent as indicated in step 402. Time series forecasting can be used to smooth the bin counts. The extent is characterized based on a dominant trait as indicated in step 404, e.g., using the bin corresponding to the dominant mode count, which is bin 2 in the illustrated example. A threshold is set based on the capacity of the SCM and SCM fall-through time as indicated in step 406, e.g., using the smaller of SCM capacity and SCM fall-through time. SCM capacity is determined by summing the extent-based capacity starting with the lowest interarrival rate bin. SCM fall-through time indicates the average amount of time that an extent resides in the SCM before being evicted. The threshold is used to evaluate BE TRKs evicted from the cache slots as indicated in step 408. Specifically, if the evicted BE TRK resides in an extent characterized by a dominant mode that is less than or equal to the threshold then the BE TRK is considered to be a throttled victim candidate. If the evicted BE TRK resides in an extent characterized by a dominant mode that is greater than the threshold then the BE TRK is not considered to be a throttled victim candidate. The least recently accessed BE TRK in the SCM is evicted to free space for a new throttled victim candidate.

Although advantages should not be considered to be limitations of the inventive concepts, it will be appreciated by those of ordinary skill in the art that some implementations will decrease the likelihood of BE TRKs being repeatedly accessed from the managed drives in relatively short time intervals. In previously known architectures, stale data in cache was overwritten by newer data based on LRU algorithms. Consequently, data could be repeatedly accessed from the backend when the cache slot fall-through time was less than the access frequency of the data, but the BE TRK was accessed multiple times within a relatively short time interval. The NVM/SCM is considered to be part of shared memory and moving data from the NVM/SCM to volatile memory requires less time than copying data from the managed drives into volatile memory. Thus, in some implementations the inventive concepts may help to maximize cache hit rate and fall-through time by using NVM/SCM to temporarily maintain the data that is more likely than other data to be accessed in the near term.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. An apparatus comprising:
a plurality of non-volatile drives;
a plurality of interconnected compute nodes configured to access the non-volatile drives responsive to input-output commands (IOs) from hosts, each compute node comprising local volatile memory and local non-volatile memory and being configured to allocate a portion of the local volatile memory and a portion of the local non-volatile memory to a shared memory that can be accessed by all the compute nodes to service the IOs from the hosts; and
a memory manager configured responsive to eviction of a backend track from the volatile portion of the shared memory to move that backend track to the non-volatile portion of the shared memory based on satisfaction of a condition indicative of temporal likelihood of future access to that backend track to service a future IO from one of the hosts.

2. The apparatus of claim 1 further comprising the memory manager being configured to calculate a cache-miss interarrival rate threshold as the condition.

3. The apparatus of claim 2 further comprising the memory manager being configured to calculate the cache-miss interarrival rate threshold based on capacity of the non-volatile portion of the shared memory and fall-through time of the non-volatile portion of the shared memory.

4. The apparatus of claim 3 further comprising the memory manager being configured to maintain countdown timers of most recent backend accesses of sub-extents of data stored on the drives.

5. The apparatus of claim 4 further comprising the memory manager being configured to use the countdown timers to generate extent-level cache-miss interarrival histograms.

6. The apparatus of claim 5 further comprising the memory manager being configured to characterize extents of data stored on the drives based on dominant modes of the extent-level cache-miss interarrival histograms.

7. The apparatus of claim 6 further comprising the memory manager being configured to compare the dominant mode of the extent in which a backend track evicted from the volatile portion of the shared memory resides with the threshold in order to determine whether the condition is satisfied.

8. A method comprising:
in a data storage system,
responsive to eviction of a backend track from a volatile portion of a shared memory comprising the volatile portion and a non-volatile portion, determining whether a condition indicative of temporal likelihood of future access to that backend track to service a future IO from a host is satisfied; and
moving that backend track to the non-volatile portion of the shared memory based on satisfaction of the condition.

9. The method of claim 8 further comprising calculating a cache-miss interarrival rate threshold as the condition.

10. The method of claim 9 further comprising calculating the cache-miss interarrival rate threshold based on capacity of the non-volatile portion of the shared memory and fall-through time of the non-volatile portion of the shared memory.

11. The method of claim 10 further comprising maintaining countdown timers of most recent backend accesses of sub-extents of data stored on the drives.

12. The method of claim 11 further comprising using the countdown timers to generate extent-level cache-miss interarrival histograms.

13. The method of claim 12 further comprising characterizing extents of data stored on the drives based on dominant modes of the extent-level cache-miss interarrival histograms.

14. The method of claim 13 further comprising comparing the dominant mode of the extent in which a backend track evicted from the volatile portion of the shared memory resides with the threshold in order to determine whether the condition is satisfied.

15. A non-transitory computer-readable storage medium storing instructions that when executed by a compute node in a storage system cause the compute node to perform a method comprising:

responsive to eviction of a backend track from a volatile portion of a shared memory comprising the volatile portion and a non-volatile portion, determining whether a condition indicative of temporal likelihood of future access to that backend track to service a future IO from a host is satisfied; and moving that backend track to the non-volatile portion of the shared memory based on satisfaction of the condition.

16. The non-transitory computer-readable storage medium of claim 15 wherein the method further comprises calculating a cache-miss interarrival rate threshold as the condition.

17. The non-transitory computer-readable storage medium of claim 16 wherein the method further comprises calculating the cache-miss interarrival rate threshold based on capacity of the non-volatile portion of the shared memory and fall-through time of the non-volatile portion of the shared memory.

18. The non-transitory computer-readable storage medium of claim 17 wherein the method further comprises maintaining countdown timers of most recent backend accesses of sub-extents of data stored on the drives.

19. The non-transitory computer-readable storage medium of claim 18 wherein the method further comprises using the countdown timers to generate extent-level cache-miss interarrival histograms.

20. The non-transitory computer-readable storage medium of claim 19 wherein the method further comprises characterizing extents of data stored on the drives based on dominant modes of the extent-level cache-miss interarrival histograms and comparing the dominant mode of the extent in which a backend track evicted from the volatile portion of the shared memory resides with the threshold in order to determine whether the condition is satisfied.

* * * * *